Sept. 6, 1927.

F. W. PAUL 1,641,500

METHOD OF AND DEVICE FOR MOUNTING THERMOMETERS

Filed Jan. 17, 1927

Inventor
FREDERICK W. PAUL

ATTORNEYS

Patented Sept. 6, 1927.

1,641,500

UNITED STATES PATENT OFFICE.

FREDERICK W. PAUL, OF MINNEAPOLIS, MINNESOTA.

METHOD OF AND DEVICE FOR MOUNTING THERMOMETERS.

Application filed January 17, 1927. Serial No. 161,589.

This invention relates to a method of and device for mounting a thermometer at the outside of a window in such manner that its readings may be viewed even when the window is frosted, and further in such a manner that the higher temperature of the room will not affect the thermometer to give false readings.

When the thermometer is placed outside the window, in order to obtain true readings for the outside temperatures, the readings cannot be seen, when the window is frosted, and it is necessary under such conditions to raise the window. It is, therefore, an object of this invention to provide an arrangement whereby such opening of the window is unnecessary, and to further provide a device, which can be very cheaply manufactured, and quickly attached to the window.

Features of the invention include; the use of a transparent material upon which to mount a thermometer, and to provide a hollow mounting formed from such material; the placing of the thermometer at the outside of this hollow mounting; sealingly securing the mounting at the outer side of the window; the provision of two sets of markings which may be respectively read from the outer and inner side of the hollow transparent support; and generally, all details of construction, including the manner of securing the thermometer upon the hollow transparent support, against longitudinal movement. Other objects, certain advantages and other features of the invention will appear in the description of the drawings forming a part of this application and in said drawings Figure 1 is a view of the device attached to the window and viewed from the inner side of the window or from within the room;

Figures 1, 3:
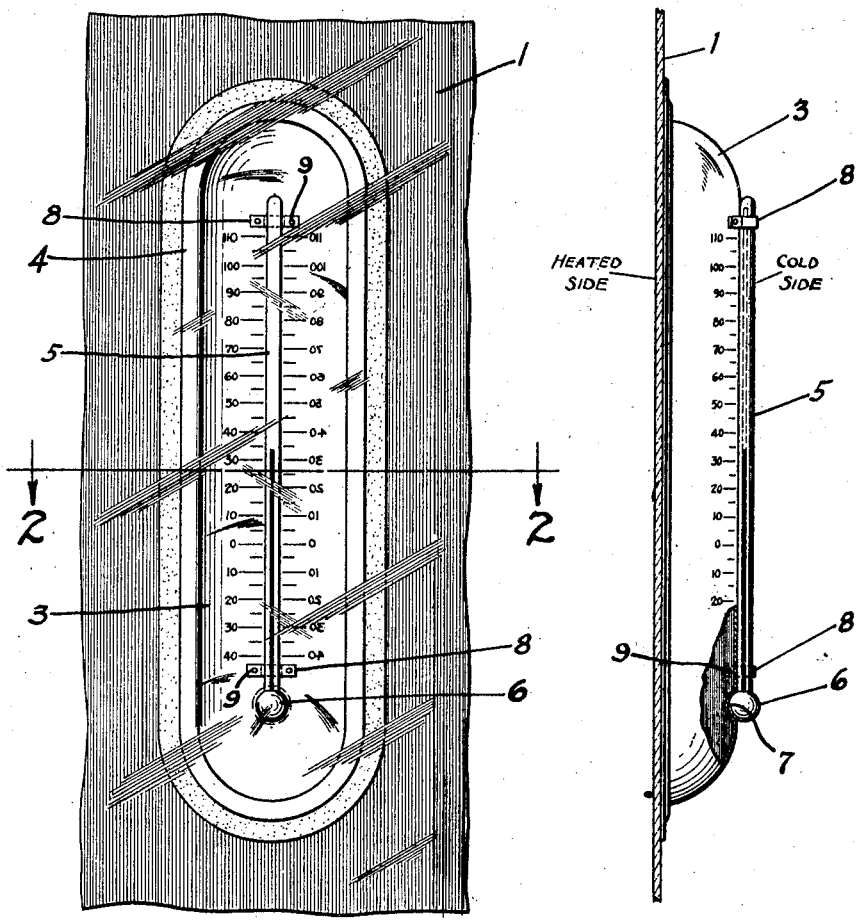
Figure 3 is a vertical section through the window, showing the mounting and its attaching means in elevation.
Figure 2:
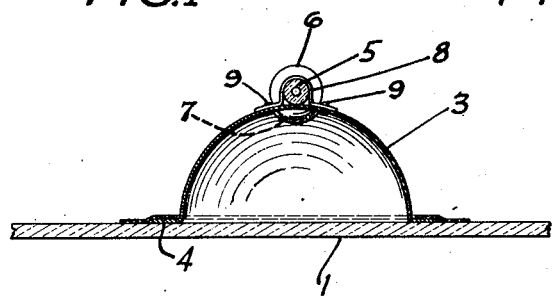
Figure 2 is a plan section on line 2—2 of Figure 1.

The numeral 1 designates a window pane of any transparent material. On the outer face of the pane is sealingly secured a hollow transparent thermometer support 3, in this instance provided with a marginal flange 4 engaged flatly against the pane. It will be understood that the support or mounting 3 may be used on an automobile window. The mounting is produced either by molding or stamping, and celluloid has been found to be a good cheap material.

The depth or thickness of this hollow body is sufficient to provide a thick layer of dead air between the outer side of the window and the outermost wall portion of the mounting. As herein shown, the hollow transparent body is sealingly secured by means of an adhesive tape, such as rubber tape used in tire repair work. It is to be understood, however, that the device may be sealingly attached by cementing or in any other approved manner. The tape above mentioned is, however, a cheap means, giving very satisfactory results, and is claimed herein. The support 3 has been shown as substantially circular in cross-section but it will be understood that the cross-sectional configuration can be changed to provide more ornamental effects, if desired.

Attached at the outer side of the transparent support 3, that is on the weather side, is a thermometer 5 of any approved construction. The bulb 6 of this thermometer is engaged in a depression 7 of the body 3, and clips 8 secure the thermometer flatly against the body in vertical position. These clips are secured as by rivets 9. It will be noted that the depression 7 acts to socket the bulb, and to prevent longitudinal movement of the thermometer.

In order that readings may be had from both the inner and outer side of the window, markings 10 are etched or otherwise produced as shown, the markings extending at opposite sides of the thermometer, and the indicating numbers being duplicated and respectively arranged to be read from the inner and outer sides.

The hollow transparent base can be made of any transparent material such, for example, as celluloid or glass. It can be easily and quickly attached, or detached no cutting of the glass being necessary. The attachment is also made in a very simple manner either by means of the tape above mentioned, or by the use of cement, all to provide and maintain a dead air space. With this device readings are visible at night from the interior of a lighted room. Thermometer readings are always visible, whatever the temperature, and whatever the condition of the pane. Moreover true readings are always had.

In the drawings the opposite sides of the glass have been designated as heated side and cold side to distinctly show the relations of all the parts to the room.

I claim as my invention:

1. In combination with a window pane, a hollow transparent support sealingly secured at its edges to the pane at the outer side, and a thermometer secured to the outer side of the support.

2. In combination with a sheet of transparent material, a hollow support sealingly secured by its edges to and at the outer side of said transparent material, and a thermometer secured to the outer side of the support.

3. In combination with a sheet of transparent material, a hollow support sealingly secured by its edges to and at the outer side of said transparent material, and a thermometer secured to the outer side of the support, said support having a depression to receive a bulb of the thermometer.

4. In combination with a sheet of transparent material, a hollow support sealingly secured by its edges to and at the outer side of said transparent material, and a thermometer secured to the outer side of the support, and thermometer markings upon said transparent support visible from both sides of the support.

5. In combination with a window pane, a hollow transparent support having a circumferential marginal flange flatly engaging the outer surface of the pane, material adhesively sealingly connecting the flange and pane to sealingly secure the support, and a thermometer secured to the outer side of the support.

In witness whereof, I have hereunto set my hand this 13th day of January, 1927.

FREDERICK W. PAUL.